United States Patent Office 3,413,803
Patented Dec. 3, 1968

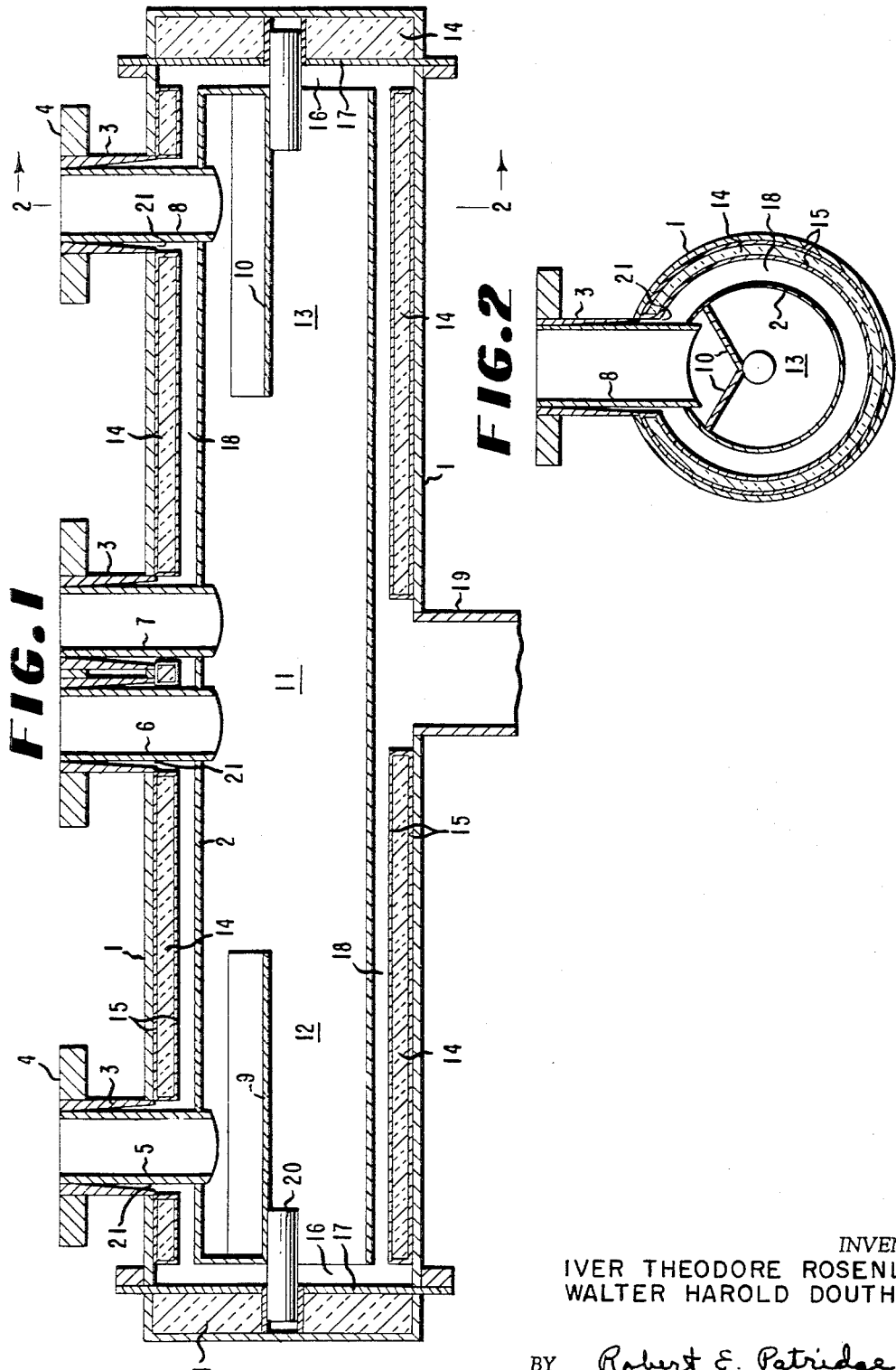

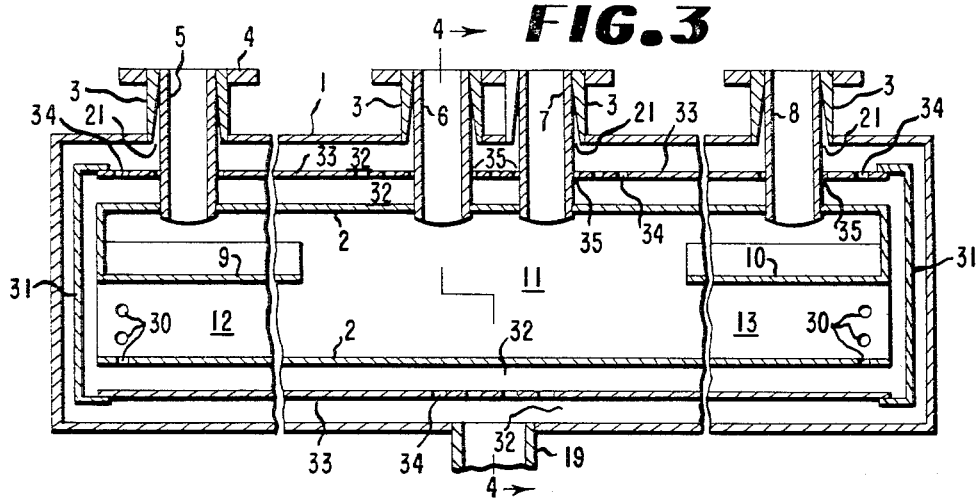
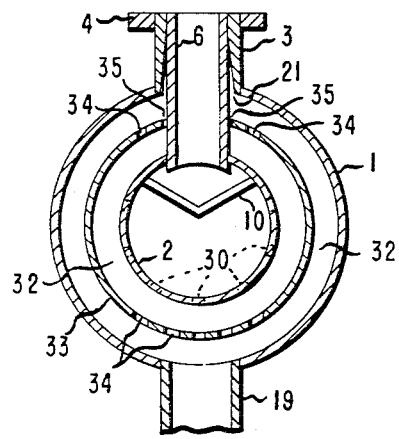
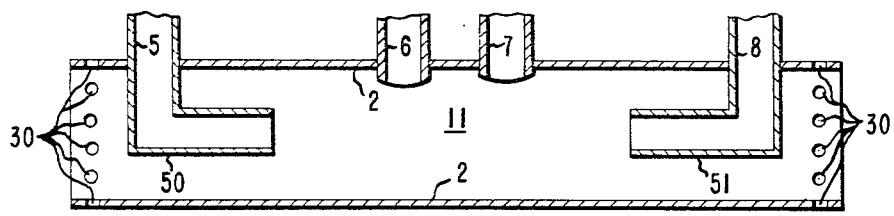

3,413,803
EXHAUST MANIFOLD REACTION SYSTEM
AND APPARATUS
Iver Theodore Rosenlund, Chester County, Pa., and Walter Harold Douthit, New Castle County, Del., assignors to E. I. du Pont de Nemours and Company, Wilmington, Del., a corporation of Delaware
Filed Feb. 24, 1967, Ser. No. 618,392
13 Claims. (Cl. 60—29)

ABSTRACT OF THE DISCLOSURE

Method of reducing the concentration of hydrocarbons and carbon monoxide in the exhaust gas from internal combustion engines by passing the exhaust gas through an exhaust manifold reactor having an outer shell positioned concentrically around an inner chamber in which streams of exhaust gas from a plurality of exhaust ports of the engine are directed into a mixing zone in the inner chamber at high velocity so as to impact at angles of at least 80° and the exhaust gas is caused to make sharp turns before exiting the inner chamber and passed through the annular space between the inner chamber and the outer shell before exiting the reactor.

*Background of the invention*

This invention relates to an improved method of reducing the concentration of hydrocarbons and carbon monoxide in exhaust gases from internal combustion engines and more particularly to further combustion of these gases in an exhaust manifold reactor.

The exhaust gases emitted by automobiles and trucks normally contain significant quantities of hydrocarbons and carbon monoxide. In recent years, the problem of emission of unburned hydrocarbons and oxidation products by automotive vehicles has assumed greater importance with the recognition that these hydrocarbons may contribute significantly to atmospheric pollution in metropolitan areas. Considerable effort has been directed toward devising ways of operating internal combustion engines so as to reduce the amount of hydrocarbon and carbon monoxide in the exhaust gas and developing economical devices for treating exhaust gases to eliminate or significantly reduce the amount of hydrocarbon and carbon monoxide contained in them.

The concentration of carbon monoxide and unburned hydrocarbons in automotive exhaust gases can vary over wide limits depending upon engine operating conditions and the state of engine adjustments. A typical automobile may emit about 200 to 300 parts per million of hydrocarbons and about 1% carbon monoxide while cruising at less than 50 miles per hour, and about 4,000 to 6,000 parts per million of hydrocarbons and 5% carbon monoxide during a deceleration from 50 to 20 miles per hour. In considering the effectiveness of any exhaust treating device, the goal is to reduce the total quantity of hydrocarbons emitted during operation of the engine. Thus, emissions during deceleration may not be as important as those during an acceleration since the total weight of exhaust gas emitted during a deceleration is considerably less than that emitted during a typical acceleration. A further consideration in determining the effectiveness of an exhaust treating device is the way a typical driver uses his vehicle. Statistics on the driving habits of typical motorists indicate that the average passenger car trip is less than ten miles in length and involves frequent acceleration and deceleration and low speed cruising.

For test purposes, a sequence of vehicle driving conditions has been adopted by the California Motor Vehicle Pollution Control Board which approximates a typical vehicle trip. The vehicle is under ambient conditions at the start of the test. The sequence involves a series of acceleration, deceleration, idle and cruise modes of operation over a period of approximately 20 minutes. Hydrocarbon and carbon monoxide concentrations determined under each of the various modes of operation are multiplied by selected weighting factors to obtain a final result which is believed to be related to the amount of carbon monoxide and unburned hydrocarbons emitted into the atmosphere during a typical trip. This test procedure is called the Test Procedure for Vehicle Exhaust Emissions or simply the California Cycle Test. It emphasizes transient operations and, in particular, low speed accelerations. At present, California law requires that the concentration of hydrocarbons in exhaust gases be reduced to not more than 275 parts per million by volume and carbon monoxide to not more than 1.5% by volume using the California Cycle Test.

One of the approaches to reducing the amount of unburned hydrocarbons and carbon monoxide in exhaust gases has been modification of the operating adjustments of the engine. Automotive engines generally operate more smoothly and have more desirable performance characteristics when the fuel-air mixture is richer than stoichiometric. With such mixtures additional air is required for complete oxidation of the exhaust gases. In U.S. Patent 2,263,318, Tifft describes the addition of air to the exhaust gases through tubes near the exhaust valves. Brownson et al. presented a paper describing tests with air introduction near the exhaust valves using conventional exhaust manifolds at a meeting of the Society of Automotive Engineers in March 1962. Equipment similar to that described in their paper has since been installed in many cars to reduce atmospheric pollution, but this system alone is not expected to meet future requirements for atmospheric pollution control.

It has been further found that increased exhaust gas oxidation can be obtained by modifying the exhaust manifold in ways which increase its efficiency as an oxidation reactor. In Patent 3,247,666, Behrens describes the use of exhaust manifold reactors in combination with air injection. His reactors comprise a pair of casing members positioned in spaced relationship to each other to define a hollow chamber therebetween. The exhaust gases pass into the inner casing member and around a baffle which increases the path of gas flow between the inlet and the outlet. In some embodiments the exhaust gas passes from the inner casing member into the hollow chamber before passing out of the reactor. Behrens indicates that further improvement can be achieved by using an exhaust back pressure valve or a catalytic reactor after the manifold. Using the California Cycle Test, hydrocarbon and carbon monoxide reductions to 270–275 p.p.m. and 0.6–1.1%, respectively, were achieved with his exhaust manifold reactor without an exhaust back pressure valve or catalytic reactor using medium size engines which gave 335–385 p.p.m. hydrocarbons and 1.0–1.3% carbon monoxide with a standard manifold. Using large size engines which gave 485–770 p.p.m. hydrocarbons and 2.5–3.0% carbon monoxide with a standard manifold, reductions to 290–325 p.p.m. and 1.1–1.6% were achieved with his exhaust manifold reactor and an exhaust back pressure valve but no catalytic reactor.

In U.S. Patent 3,302,394, Pahnke and Sowards describe a circumferential exhaust manifold reactor containing an inner reaction chamber and an outer shell positioned concentrically around the inner reaction chamber with a plurality of heat reflecting shields located between the outer shell and the inner reaction chamber. Exhaust gases pass from the engine into the inner reaction chamber and from the inner chamber through passageways between the heat reflecting shields indirectly to an exit in the outer shell. Using the California Cycle Test in Example 7, hydrocarbon and carbon monoxide concentrations were reduced to 82 p.p.m. and 0.92%, respectively, with their reactor using an engine which gave 503 p.p.m. hydrocarbons and 2.38% carbon monoxide with a standard manifold. Although the amount of improvement obtained with the Pahnke and Sowards exhaust manifold reactor is greater than that obtained with the Behrens exhaust manifold reactor, there is a need for exhaust manifold reactors which give even greater reductions in hydrocarbons and carbon monoxide concentrations in exhaust gas.

*Description of the invention*

An improvement has now been discovered in the method of reducing the concentration of hydrocarbons and carbon monoxide in the exhaust gas from an internal combustion engine by passing said exhaust gas through an exhaust manifold reactor having an outer shell positioned concentrically around an inner reaction chamber. Said improvement comprises passing a stream of exhaust gas from each of a plurality of exhaust ports of said engine through the outer shell of said reactor into a mixing zone in said inner chamber, maintaining the velocity of each stream of exhaust gas throughout its passage from said exhaust port to said mixing zone at about 0.5 to 2.0 times the velocity at which it passes through the exhaust port, passing at least two of said plurality of streams of exhaust gas into the mixing zone at angles of at least about 80° with respect to each other, passing the exhaust gas out of said inner chamber in a direction which causes a portion of the gas in each stream of exhaust gas entering the mixing zone to make a turn of at least 80° before exiting said inner chamber and causes a portion of the gas in at least one stream of exhaust gas to make a turn of more than about 90° before exiting said inner chamber, passing the exhaust gas exiting from said inner chamber indirectly through the annular space between said inner chamber and said outer shell to the outlet from said reactor, said exhaust manifold reactor having a total internal free volume of at least twice the displacement volume of any one cylinder exhausting into it and not greater than four times the total displacement of all cylinders exhausting into it.

The exhaust manifold reaction system of this invention provides outstanding reductions in the concentration of hydrocarbons and carbon monoxide in exhaust gases from internal combustion engines. An important feature of the reaction system of this invention is maintaining of the velocity of each stream throughout its passage from the exhaust port of the engine to the mixing zone of the inner reaction chamber at about 0.5 to 2.0 times the velocity at which it passes through the exhaust port. It has been found that the heat conserved by maintaining this velocity increases the temperature in the inner reaction chamber and thus has a favorable effect upon the efficiency of the system in reducing the concentration of hydrocarbons and carbon monoxide in the exhaust gases. Preferably, the velocity of each stream of exhaust gas throughout its passage from said exhaust port to said mixing zone is 0.75 to 1.25 times the velocity at which it passes through the exhaust port.

The rapid, complete and continuous mixing of exhaust gases required for their complete oxidation is provided by various features of the oxidation reactor system of this invention. The mixing zone provides mixing of exhaust gases as soon as practical after they pass through the engine exhaust ports and under conditions which promote oxidation. The gases exhausted from the different cylinders pass through this mixing zone in turn. The hot reacted gases remaining in the mixing zone after the discharge of each cylinder help increase the temperature of the incoming gases and increase their rate of reaction. Turbulent mixing in this zone is promoted by the impact of various exhaust streams in the mixing zone resulting from the angles at which at least two of the streams enter the mixing zone. These angles should be at least about 80° and preferably at least about 90° and may be as high as about 180°.

Turbulent mixing is also promoted by the relative directions in which the exhaust gases enter and exit the mixing zone. The configuration of the mixing zone causes a portion of the gas in each stream of exhaust gas to make a turn of at least about 80° and a portion of the gas in at least one stream of exhaust gas to make a turn of more than about 90° before exiting the inner reaction chamber. Preferably, all streams of exhaust gas are caused to make a turn of at least 90° and a portion of the gas in at least one stream of exhaust gas is caused to make a turn of about 180° before exiting the inner reaction chamber.

In the drawings, FIGURE 1 illustrates a plan view in section of an exhaust manifold reactor suitable for carrying out the method of this invention. FIGURE 2 illustrates a section of the manifold reactor of FIGURE 1 taken along line 2—2 of FIGURE 1. FIGURE 3 represents a plan view in section of another suitable manifold reactor which is a modification of the reactor of FIGURE 1. FIGURE 4 illustrates a section of the manifold reactor of FIGURE 3 taken along line 4—4 of FIGURE 3. FIGURE 5 illustrates the plan view of a modified inner reaction chamber which alternately may be used in the exhaust manifold reactors illustrated in FIGURES 1 and 3.

Referring now to FIGURE 1, the exhaust manifold reactor is based upon two concentric members, an outer shell 1 and an inner reaction chamber 2. Outer shell 1 has integral shell extensions 3 and flanges 4 which may be used to connect the outer shell of the reactor to the internal combustion engine adjacent to the exhaust ports of the engine. The reactor illustrated in FIGURE 1 is designed for use in connection with four exhaust ports of the engine. Extensions 3 surround exhaust port extension conduits 5, 6, 7 and 8 which direct the flow of exhaust gases from the four exhaust ports of the engine (not illustrated) through outer shell 1 into inner reaction chamber 2.

Inner reaction chamber 2, which acts as the manifold, contains baffles 9 and 10 which direct the exhaust gas passing from port extension conduits 5 and 8 to mixing zone 11 of inner reaction chamber 2. Turbulent mixing of the reacting gases takes place in mixing zone 11 due to alternation in flow from the different exhaust ports of the engine as governed by the timing which controls the firing sequence of the engine. The cross-sectional area of the passage means above baffles 9 and 10 is restricted by the V-shape of these baffles as illustrated in FIGURE 2. Baffles 9 and 10 may also be U-shaped or in any other shape which can be conveniently fabricated. As illustrated in FIGURES 1 and 2, the cross-sectional area of the passage means above baffles 9 and 10 is substantially equivalent to the cross-sectional area of the port extension conduits which are also substantially equivalent to the cross-sectional area of the ports of the engine.

Oxidation of hydrocarbons and of carbon monoxide contained in the exhaust gases is accelerated in mixing zone 11 and continues as the reacting gases flow through the remainder of the reactor. Under the firing sequence of a typical four cycle internal combustion engine, no two cylinders fire simultaneously. Thus, inner reaction chamber 2 at any given time contains exhaust gases from primarily one exhaust port. However, because of the limited size of the exhaust manifold reactor, there will be some impact and intermixing between the end portion of exhaust gas from one exhaust port and the beginning portion of exhaust gas from the next exhaust port in the firing sequence. This intermixing causes a pulsing type turbulence in the inner reaction chamber. When air injection is used in combination with the exhaust manifold reactor, further turbulence is caused in mixing zone 11 by impact between the stream of air coming from three of the exhaust port extension conduits and the exhaust gas from the fourth port extension conduit entering the mixing zone at angles of at least 80° with respect to each other. Turbulence is also caused by sharp turns required for the exhaust gas to exit mixing zone 11 into exit zones 12 and 13 of the inner reaction chamber. In order to equalize pressure within the system approximately half of the exhaust gas within mixing zone 11 will exit the inner chamber through exit zone 12 and the other half through exit zone 13.

Outer shell 1 is insulated on its interior surface by a layer of insulation 14. The insulating layer 14 may be of any structure and composition which provides effective insulation and has a practical life under the conditions existing within the reactor. The high temperatures, oxidizing atmosphere, and erosive conditions make it desirable to use liners 15 when the insulating material is not sufficiently durable by itself. Useful insulating materials are fibrous ceramic materials with thermal conductivities of approximately 0.8 B.t.u./hr./° F./sq./ft./in. An effective method of utilizing these materials in thin layers is to sandwich the insulation between tow concentric metal tubes with a wall thickness of about 0.030 inch as illustrated by liner 15.

Exhaust gases exiting inner reaction chamber 2 through exit zones 12 and 13 undergo sharp changes in direction in zones 16 at the open ends of inner reaction chamber 2 due to impingement with end cap 17 which acts as a liner for insulation 14 at the ends of outer shell 1. The reacting gases then flow through the annular space 18 between inner reaction chamber 2 and the concentric insulating layer 14 longitudinally toward the center of the reactor and circumferentially around inner reaction chamber 2 to exit through exhaust pipe connection 19.

Normal operation of an automobile exposes exhaust manifold reactors to quick, large and severe changes in temperature. For instance, portions of the reactor are quickly heated to about 1500° F. soon after the engine has started, while other parts of the same reactor may remain at temperatures below 500° F. after many minutes of operation. Moreover, the temperature to which individual parts of the reactor are exposed is also constantly changing. Experience with exhaust manifold reactors of the type illustrated in FIGURES 1 and 2 has shown that inner reaction chamber 2 and exhaust port extension conduits 5, 6, 7 and 8 are subject to severe thermal stresses and expansion thereby causing distortion which can result in cracking and other failures of the reactor. Accordingly, inner reaction chamber 2 and exhaust port extension conduits 5, 6, 7 and 8 are provided with slip-fit attachment to outer shell 1. Inner reaction chamber 2 is mounted within outer shell 1 by means of plug 20 which slips within the mounting in the outer shell thereby allowing inner reaction chamber 2 to move in a longitudinal direction with respect to the outer shell during expansion and contraction due to temperature changes. Other shell extensions 3 are tapered so as to provide an annular space 21 between exhaust port extension conduits 5, 6, 7 and 8 and outer shell extensions 3. This arrangement allows port extension conduits 5, 6, 7 and 8 to move within annular space 21 as inner reaction chamber 2 moves longitudinally under expansion and contraction. Annular spaces 21, which are in communication with annular space 18, provide means for preheating exhaust gases entering inner reaction chamber 2 through exhaust port extension conduits 5, 6, 7 and 8. This expedient, in combination with the high velocity at which the exhaust port gases pass through the port extension conduits, conserve heat and thereby contribute to increasing the temperature of the oxidation reaction within the reactor.

Referring now to FIGURES 3 and 4, an exhaust manifold reactor is illustrated which is a modification of the reactor of FIGURES 1 and 2. In this modification, a heat reflecting shield with end caps is used in place of the insulating material illustrated in FIGURES 1 and 2. This reactor is based upon three concentric members, an outer shell 1, an inner reaction chamber 2 and a heat reflecting shield 32 separated by suitable spacers (not illustrated). The exhaust gases from the exhaust ports of the engine pass through exhaust port extension conduits 5, 6, 7 and 8 into inner reaction chamber 2 where the gases from exhaust port extensions 5 and 8 are diverted by baffles 9 and 10. All exhaust gases pass into mixing zone 11 where turbulence takes place as discussed with respect to FIGURES 1 and 2. The reacting gases flow from the mixing zone 11 through exit zones 12 and 13 and undergo sharp changes in direction as they pass through holes 30 and through zones 16 beyond the open ends of inner reaction chamber 2 because of impingement on end caps 31. The reacting gases flowing between heat reflecting shield 33 and reaction chamber 2 pass through holes 34 in the heat reflecting shield and through annular passages 35 around the port extension conduits and exit through exhaust pipe connection 19.

FIGURE 5 shows still another arrangement in which extensions 50 and 51 of port extension conduits 5 and 8 are used rather than baffles 9 and 10 in inner reaction chamber 2. Such extensions may have the sharp corners shown in FIG. 5 or may be formed by bending suitable tubing so as to have smooth corners. The tubing used in making these extensions may be round, oval, square, or of any other convenient cross-section.

Other alternate and equivalent embodiments are suggested by these figures. For instance, multiple heat reflecting shields may be used in FIGURES 3 and 4. Another useful insulating arrangement is a collection of concentric tubes of about 0.030 inch wall thickness, of slip-fit tightness inside each other and inside the outer shell. The insulating effect of such tubes is increased by perforating them with small holes which provide dead gas space in the construction. Heat reflecting shields may also be used in combination with insulating layers. Turbulence in the mixing zone can be further enhanced by the use of paddles, vanes, projections, and the like in mixing zone 11.

Although mixing zone 11 is illustrated in the drawing as being a central mixing zone within inner reaction chamber 2, this invention is not limited to such position of the mixing zone. A suitable mixing zone at one end of inner reaction chamber 2 could be provided by eliminating baffle 10 in FIGURES 1 and 2 and extending baffle 9 in a horizontal direction so that it terminates intermediate between port extension conduits 7 and 8. In this case, exit zone 13 would be eliminated by providing an end cap which would prevent flow of exhaust gas from end zone 13 into passageway 16. Accordingly, all gases would exit inner reaction chamber 2 through exit zone 12. It may then be desirable to relocate exhaust pipe connection 19 near the end of the reactor, for example, opposite port extension conduit 8.

It is understood, in the practice of the present invention, that exhaust manifold reactors can be designed for use in combination with internal combustion engines of two or more cylinders for example, four, six or eight. The term "plurality of exhaust ports," as used in the specification and claims, is intended to cover two or more exhaust ports.

The exhaust manifold reactors may be installed on internal combustion engines in any of several ways obvious to those skilled in the art. The major requirement is that all of the exhaust gas from the engine must pass through an exhaust manifold reactor. As an example, on an eight-cylinder engine of V-type construction, it would be convenient to install a reactor on each side of the engine such that each reactor receives the exhaust gas from four exhaust ports. On the other hand, it would be possible to place two reactors on each side of the engine so that each reactor receives the exhaust mixture from two exhaust ports. It would also be quite feasible to place the exhaust manifold reactor in the center of the V, such that all eight exhaust ports could be connected directly to the reactor and to use two carburetors and intake systems, one on each side of the V. Similarly, on a V–4 or V–6, or a horizontally opposed 4, 6 or 8-cylinder engine, two reactors could be advantageously employed, each receiving the exhaust gas from half of the exhaust ports.

For in-line type engines, a single exhaust manifold reactor might be employed to receive the exhaust gas from all of the exhaust ports. For various construction reasons, however, two or more exhaust manifold reactors could be attached. For example, on a six-cylinder engine two reactors might be installed, each of which would handle three exhaust ports. With these examples in mind there are many other methods of installing one or more reactors on internal combustion engines which would be obvious to those skilled in the art.

Appropriate back pressure control elements can be incorporated as necessary. The use of a conventional muffler is not essential to achieving the improved results described herein. The range of automotive fuels for internal combustion engines is fully operative in the practice of this invention, whether said fuels are leaded or unleaded.

The exhaust gas oxidation system of this invention is unusually effective in reducing the concentration of hydrocarbons and carbon monoxide in exhaust gases because it provides, to an unusual degree, the conditions required for the rapid and complete oxidation of such gases. It provides efficient mixing of the reacting gases, adequate residence time for reaction and a high temperature environment.

Sufficient residence time for essentially complete oxidation is provided when the total internal free volume of the exhaust gas reactor is at least twice the displacement volume of any one cylinder exhausting into it. The total free volume includes both the internal volume of the inner reaction chamber and the free volumes of the annular spaces between the chamber and the shell. This total free volume is preferably between about 0.75 and 3.0 times the total displacement of all cylinders exhausting into the reactor, but may be as much as about 4.0 times the total displacement. Significantly larger volumes than those specified may reduce the overall effectiveness of the system due to factors such as excessive cooling of the reacted gases, rapid heat losses usually characteristic of larger surface areas and the larger amounts of metal required.

The fraction of the total free volume of the reactor which is within the inner reaction chamber may be varied within wide limits. The preferred fraction is about 25% to 75% and most preferably about 50%. With the reaction chamber volume and the annular space volumes nearly equal, and the total volume within the indicated range, residence time in the inner reaction chamber is sufficient for completion of a major part of the exhaust gas oxidation, and residence time in the annular space is sufficient for substantial completion of the oxidation. The size of the mixing zone may be varied within wide limits, and is preferably between about 0.50 and 3.0 times the displacement of one of the cylinders exhausting into it. Most preferably it is between about 1.0 and about 2 times the displacement of one cylinder.

The rapid, complete and continuous mixing of the reacting exhaust gases is also provided by the shapes and sizes of the passages between the inner reaction chamber and the exhaust pipe connection. The sizes of the passages through which the reacting gases flow are important in maintaining efficient mixing of the gases. These sizes are chosen to produce turbulent mixing without significant increase in the back pressure of gases in the reaction system. The preferred size for any engine is that which produces essentially the same or less back pressure as the standard exhaust manifold normally used with the engine. For instance, the limiting passage is usually in zone 16 at the ends of inner reaction chamber 2. For any particular engine, the combined cross-sectional flow areas of these zones are between about 1.0 and about 2.0 times the cross-sectional area of the usual exhaust pipe and are preferably between about 1.1 and about 1.5 times this cross-sectional area. Zones 16 need not be of any particular uniform shape but may be of non-uniform shapes which may help promote an even distribution of flow of reacting gases throughout the annular space surrounding the inner reaction chamber. The combined cross-sectional area of the annular space between the inner reaction chamber and the outer shell is between about 1.5 and 4.0 times the cross-sectional area of the usual exhaust pipe, and preferably between about 2 to 3 times the exhaust pipe cross-sectional area. For reactors having central mixing zones as in the case of those illustrated in the drawing, the combined cross-sectional area of the annular space is two times the cross-sectional area of annular space 18 illustrated in FIGURE 2 since exhaust gases approach exhaust pipe connection 19 from two directions.

The high temperature environment required for rapid and complete oxidation of exhaust gases is provided by several features of the oxidation reactor system of this invention. Close coupling of the inner reaction chamber to the exhaust ports of the engine minimizes cooling of the exhaust gases before they are mixed in the reaction chamber. Countercurrent flow of hot reacted gases and reacting gases in several zones of the reactor provides for efficient use of the heat of reaction to promote rapid reaction of incoming gases. Particularly important in this respect is the recirculation of hot reacted gases, for example, through exit zones 12 and 13 and annular spaces 18 and 21. Maintenance of high temperatures inside the inner reaction chamber is also assisted by heat reflecting shields or insulating layers between the inner reaction chamber and the outer shell. Particularly important is effective heat reflection and/or insulation at the ends of the chamber and shell. The unusually complete oxidation of exhaust gases obtained with this manifold reactor system reflects an optimum combination of all these factors.

The various parts of the exhaust gas oxidation reactors of this invention can be made of any of the conventional materials of construction used in such high temperature applications. The outer shell can be made of common materials such as cast iron or welded steel. The inner reaction chamber, heat reflecting shields, linings for insulation, and other parts which are subjected to high temperatures can be made of the stainless steels or other alloyed materials which withstand such hot, corrosive, and erosive atmospheres generated within these reactors. These alloys can be fabricated by rolling, casting, forging, or other means in sufficiently thin sections to provide a combination of the required mechanical strength and low weight. Suitable metal thicknesses for these internal parts may range from a few to about 200 thousandths of an inch and preferably less than about 70 thousandths of an inch.

The various parts of these reactors may be made in any shapes which are convenient for production, assembly, and installation. Welding, casting, brazing and other conventional techniques can be used for manufacturing these parts. Cylindrical shapes are particularly convenient for welded and slip-fit construction, but other shapes can be used which might be better suited for casting or other production techniques.

The exhaust gas oxidation system of this invention significantly reduces the amount of hydrocarbons in automotive exhaust gases even without injecting auxiliary air into the exhaust ports as required by some of the prior art systems. Even larger reductions are obtained with auxiliary air.

The auxiliary air is advantageously introduced into exhaust ports of the engine at a pressure somewhat higher than atmospheric pressure to overcome the back pressure of the manifold exhaust reactor and exhaust system. The required pressure can be obtained with any suitable impeller, piston, diaphragm, or vane pump. This pump can conveniently be driven by the engine itself, so that the amount of air delivered will be related to engine speed. The amount of air required will depend upon many variables well known in the field, and can be modified or regulated in any suitable way to be responsive to the position of the accelerator pedal of the car, the intake manifold vacuum of the engine, or any other indicator of air requirements.

Auxiliary air can be introduced into the exhaust ports of the engine through holes in these ports, through tubes leading into the ports, through slots or holes in the exhaust valve, or in any other practical way, but it will preferably be introduced near the exhaust valve. A portion of the auxiliary air may also be introduced directly into the inner reaction chamber of the exhaust manifold reactor. The auxiliary air can be introduced either continuously or intermittently.

Some increase in the efficiency of exhaust gas oxidation may be obtained if the auxiliary air is preheated without reducing the temperature of the unreacted exhaust gases or the inner reaction chamber. This can be accomplished with an auxiliary heating device or by heat exchange with the reacted exhaust gases after they pass through the exhaust manifold reactor. If desired, the auxiliary air can be taken from the crankcase or from any other air space in the engine in which air may have been heated or may have picked up unburned hydrocarbon, blow-by, or other materials which can advantageously be passed through the exhaust manifold reactor.

Optimum results are obtained with auxiliary air when the carburetor is set to deliver a fuel-air mixture somewhat richer than stoichiometric. Without auxiliary air, minimum emission levels are obtained when the carburetor is set to give stoichiometric or somewhat leaner fuel-air mixtures.

The following examples, illustrating the novel exhaust manifold reaction system of this invention and the results obtained with the exhaust manifold reactors of this invention, are given without any intention that the invention be limited thereto. All tests were conducted by the official procedures of the State of California as described by the Motor Vehicle Pollution Control Board in its pamphlet, "California Procedure for Testing Motor Vehicle Exhaust Emissions" as revised Jan. 23, 1964. In accordance with this test procedure, all parts and percentages are reported by volume.

EXAMPLE 1

(A) In this example, an exhaust manifold reactor similar to that illustrated in FIGURES 1 and 2 was employed. The reactor was constructed with an outer shell of 4.5 inches outside diameter, 0.125 inch wall thickness and 19.75 inches length. The inner reaction chamber was of 2.75 inches outside diameter, 0.065 inch wall thickness and 19.0 inches length. The flow directing baffles in the center of the inner reaction chamber were each 5.0 inches long and had 1.125 inch legs joined together to form a 120° angle as illustrated in FIGURE 2 and extended approximately to the mid-point between the outer exhaust port extension conduits and the inner exhaust port extension conduits. A layer of insulation consisting of a 0.25 inch thick layer of ceramic fibrous material with a thermal conductivity of approximately 0.8 B.t.u./hr./° F./sq. ft./in. was installed next to the inner surface of the outer shell. This fibrous material was sandwiched between two concentric metal tubes with wall thicknesses of 0.030 inch. The ends of the outer shell were covered with two metal plates, the inner plate being 0.125 inch thick, with insulation 0.625 inch thick between them. The hollow plug for slip mounting of the inner reaction chamber to the ends of the outer shell was of 0.5 inch diameter.

This reactor was mounted on one bank of a 1965, 283 cubic inch Chevrolet V-8 engine with automatic transmission which was mounted on a test stand. The engine was equipped with the Saginaw air pump, special carburetor, distributor, air lines and necessary valves to give the complete Air Injection Reactor system as installed on the automobiles sold in the State of California in 1966. The carburetor heating cross-over passages of the engine were modified on one bank so that the reactor mounted on that bank of four cylinders received exhaust gases from those cylinders only. The carburetor was modified slightly to give a richer fuel-air ratio in the idle and intermediate speed ranges.

When the reactor was tested under the California test procedure, the composite hydrocarbon level was 9.6 p.p.m. and the carbon monoxide level was 0.28%.

(B) In this example, the procedure of Example 1(A) was repeated except that the carburetor was not modified, but was set according to the manufacturer's specification. When the reactor was tested under the California test procedure, the composite hydrocarbon level was 15 p.p.m. and the carbon monoxide level was 0.43%.

(C) The procedure of Example 1(A) was repeated as follows: The air injection pump was disconnected from the engine and the lines carrying the air to the exhaust ports were blocked. The exhaust cross-over passage was unblocked so that the engine was restored to its normal operating condition. The carburetor was adjusted for special lean operation. Exhaust manifold reactors, as described in Example 1(A), were installed on both banks of the engine. When the reactors were tested under the California test procedure, the hydrocarbon level was 133 p.p.m. and the carbon monoxide level was 0.89%.

(D) For comparison, the procedure of Example 1B was repeated except that a standard production exhaust manifold was used in place of the exhaust manifold reactor. The engine was operated under the California test procedure and the hydrocarbon level was 180 p.p.m. and the carbon monoxide level was 1.58%.

(E) For comparison, the procedure of Example 1A was repeated except that a standard production exhaust manifold was used in place of the exhaust manifold reactor. The engine was operated under the California test procedure and the hydrocarbon level was 167 p.p.m. and the carbon monoxide level was 0.83%.

TABLE 1

|  | Example | | | | |
| --- | --- | --- | --- | --- | --- |
|  | 1A | 1B | 1C | 1D | 1E |
| Reactor of Fig. 1 | x | x | x |  |  |
| Standard manifold |  |  |  | x | x |
| Carburetion | (¹) | (²) | (³) | (²) | (³) |
| California Cycle Test: | | | | | |
| With air injection: | | | | | |
| Hydrocarbons, p.p.m. | 9.6 | 15 |  | 180 |  |
| Carbon monoxide, percent | 0.28 | 0.43 |  | 1.58 |  |
| Without air injection: | | | | | |
| Hydrocarbons, p.p.m. |  |  | 133 |  | 167 |
| Carbon monoxide, percent |  |  | 0.89 |  | 0.83 |

¹ Rich.  ² Standard.  ³ Lean.

EXAMPLE 2

(A) In this example, an exhaust manifold reactor similar to that illustrated in FIGURE 3 with an inner reaction chamber modification as illustrated in FIGURE 5 was used. This reactor was constructed as follows. The outer shell was 3 inches outside diameter tubing, 19 inches long with a 0.125 inch wall thickness. An inner reaction chamber of 2.25 inch outside diameter and a wall thickness of 0.065 inch was used. One heat reflecting shield of 2.625 in. outside diameter and a wall thickness of 0.065 inch was employed along with end caps. Holes were cut through the tubes so that port extension conduits could be installed for the passage of exhaust gases into the inner reaction chamber. Exhaust port extension conduit extensions 50 and 51, as illustrated in FIGURE 5, were used. These extensions were constructed of 1.75 inch outside diameter tubing with a 0.065 inch wall thickness and extended approximately half the distance between the outer exhaust port extension conduit and the inner exhaust port extension conduit.

The reactor was installed on one bank of a 1964, 327 cubic inch Chevrolet V-8 engine mounted on a laboratory test stand. The air was supplied to the exhaust ports from a Saginaw air pump which was belt driven from the engine crankshaft. The standard 1964 Chevrolet carburetor and distributor were used with the only modification being that necessary to give basic spark advance at idle. The carburetor heating crossover passages of the engine were modified on one bank so that the reactor mounted on that bank of four cylinders received exhaust gases from those cylinders only. When the reactor was tested under the California test procedure, the composite hydrocarbon level was 42 p.p.m. and the carbon monoxide level was 0.78%.

(B) For comparison, the procedure of Example 2(A) was repeated except that a longitudinal flow, radiation shielded reactor, as illustrated in FIGURES 1 and 2 of Pahnke and Sowards Patent 3,302,394, was used in place of the exhaust manifold reactor of this invention. The reactor was constructed as follows: The outer shell was 3-inch outside diameter tubing, 19 inches long with a wall thickness of 0.125 inch. The core diameter was 2.0 inches outside diameter and the wall thickness was 0.065 inch. One radiation shield of 2.5 inches outside diameter and 0.049 inch wall thickness was used. In addition, the outer shell was enclosed in a 3.5-inch outside diameter windshield which had a wall thickness of 0.065 inch. Holes were cut through the tubes so that inlets could be installed for the passage of exhaust gases and auxiliary air to the inner core. The exhaust gases flowed out one end of the core and then flowed longitudinally between the core, radiation shield and outer shell, to exit from the other end of the reactor. The ends of the reactor were closed with parallel plates.

When the reactor was tested under the California test procedure, the composite hydrocarbon level was 93 p.p.m. and the composite carbon monoxide level was 1.20%.

(C) For comparison, the procedure of Example 2(A) was repeated except that a circumferential flow, radiation shielded reactor as illustrated in FIGURE 4 of Pahnke and Sowards Patent 3,302,394 was used in place of the exhaust manifold reactor of this invention. The reactor was constructed as follows: The outer shell was 3-inch outside diameter tubing, 19 inches long with a 0.125 inch wall thickness. A core diameter of 1.9 inches outside diameter and a wall thickness of 0.065 inch was used. One radiation shield of 2.375 inches outside diameter and 0.065 inch wall thickness was employed. Holes were cut through the tubes so that inlets could be installed for the passage of exhaust gases through the inner reactor core. Other holes were also cut as illustrated in FIGURES 4 and 5 of the Pahnke and Sowards patent so that the exhaust gases could exit from the inner reactor core in the passages between the core, the heat reflecting shield and the outer shell. The ends of the pipes were closed with parallel plates.

When the reactor was tested under the California test procedure, the composite hydrocarbon level was 106 p.p.m. and the composite carbon monoxide level was 1.27%.

TABLE 2

|  | Example | | |
|---|---|---|---|
|  | 2A | 2B | 2C |
| Reactor of Fig. 5 in Fig. 3 | x | | |
| Pahnke et al. Fig. 1 | | x | |
| Pahnke et al. Fig. 4 | | | x |
| California Cycle Test with air injection: | | | |
| Hydrocarbons, p.p.m. | 42 | 93 | 106 |
| Carbon monoxide, percent | 0.78 | 1.20 | 1.27 |

Example 3

Example 2(A) was repeated except that a different exhaust manifold reactor was used, as illustrated in FIGURE 3 with an inner reaction chamber modification as illustrated in FIGURE 5. The reactor was built using a cast iron cylindrically shaped outer shell having an outside diameter of approximately 4 inches and a wall thickness averaging 3/16 inch. The length was 18 inches. The extensions and flanges required to fasten the shell to the engine head and the exhaust outlet were an integral part of the shell. An inner reaction chamber of 2.375 inches outside diameter and a wall thickness of 0.065 inch was used. A heat reflecting shield of 3.125 inches outside diameter and 0.065 inch wall thickness was used along with end caps. Tubes to extend the exhaust port extension conduits as illustrated in FIGURE 5 were used to achieve mixing. These tubes were constructed of 1.75 inches outside diameter tubing with a wall thickness of 0.065 inch and extended 4.5 inches from the outer exhaust port extension conduits towards the inner exhaust port extension conduits.

When this reactor was tested under the California test procedure, the hydrocarbon level was 55 p.p.m. and the carbon monoxide level was 0.76%.

Although the invention has been described and exemplified by way of specific embodiments, it is not intended that it be limited thereto. As will be apparent to those skilled in the art, numerous modifications and variations of the specific exhaust manifold reactors illustrated in the drawing may be made without departing from the spirit of the invention or the scope of the following claims.

The embodiments of the invention in which an exclusive property or privilege is claimed are defined as follows:

1. In the method of reducing the concentration of hydrocarbons and carbon monoxide in the exhaust gas from an internal combustion engine by passing said exhaust gas through an exhaust manifold reactor having an outer shell positioned concentrically around an inner reaction chamber, the improvement which comprises passing a stream of exhaust gas from each of a plurality of exhaust ports of said engine through the outer shell of said reactor into a mixing zone in said inner chamber, maintaining the velocity of each stream of exhaust gas throughout its passage from said exhaust port to said mixing zone at 0.5 to 2.0 times the velocity at which it passes through the exhaust port, passing at least two of said plurality of streams of exhaust gas into the mixing zone at angles of at least 80° with respect to each other, passing the exhaust gas out of said inner chamber in a direction which causes a portion of the gas in each stream of exhaust gas entering said mixing zone to make a turn of at least 80° before exiting said inner chamber and causes a portion of the gas in at least one stream of exhaust gas to make a turn of more than 90° before exiting said inner chamber, passing the exhaust gas exiting from said inner chamber indirectly through the annular space between said inner chamber and said outer shell to the outlet from said reactor, said reactor having a total internal free volume of at least twice the displacement volume of any one cylinder exhausting into it and not greater than four times the total displacement volume of all cylinders exhausting into it.

2. The method of claim 1 in which the velocity of each stream of exhaust gas throughout its passage from said exhaust port to said mixing zone is maintained at 0.75 to 1.25 times the velocity at which it passes through the exhaust port.

3. The method of claim 1 in which at least two of said plurality of streams of exhaust gas are passed into said mixing zone at angles of at least 90° with respect to each other, all streams of exhaust gas entering said mixing zone make a turn of at least 90° before exiting said inner chamber, and a portion of the gas in at least one stream of exhaust gas entering said mixing zone makes a turn of 180° before exiting said inner chamber.

4. The method of claim 1 in which said reactor has a total internal free volume of 0.75 to 3 times the total displacement volume of all cylinders exhausting into it.

5. The method of claim 1 in which the velocity of each stream of exhaust gas throughout its passage from said exhaust port to said mixing zone is maintained at 0.75 to 1.25 times the velocity at which it passes through the exhaust port, at least two of said plurality of streams of exhaust gas are passed into said mixing zone at angles of at least 90°, with respect to each other, all streams of exhaust gas entering said mixing zone make a turn of at least 90° before exiting said inner chamber, a portion of the gas in at least one stream of exhaust gas entering said mixing zone makes a turn of 180° before exiting said inner chamber, and said reactor has a total internal free volume of 0.75 to 3 times the total displacement volume of all cylinders exhausting into it.

6. The method of claim 1 in which the exhaust gas in said annular space is in heat exchange with each stream of exhaust gas entering said inner chamber for substantially the entire path of the exhaust gas from the exhaust port of the engine to said inner chamber.

7. An exhaust manifold reactor for reducing the concentration of hydrocarbons and carbon monoxide in the exhaust gas from an internal combustion engine which comprises an outer shell positioned concentrically around an inner reaction chamber, said outer shell including means for mounting said reactor on said engine adjacent to a plurality of exhaust ports of said engine, a plurality of passage means for passing a stream of exhaust gas from each of said plurality of exhaust ports through said outer shell into a mixing zone in said inner chamber, each passage means having throughout its length a cross-sectional area of 0.5–2.0 times the cross-sectional area of the exhaust port of the engine, said passage means terminating in said inner chamber such that at least two of the streams of exhaust gas enter the mixing zone at angles of at least 80° with respect to each other, said inner chamber being in communication with the annular space between said inner chamber and said outer shell through an exit opening in said inner chamber, said opening being positioned with respect to the terminal portion of said passage means such that a portion of the gas in each stream of exhaust gas entering said mixing zone makes a turn of at least 80° before exiting said inner chamber and a portion of the gas in at least one stream of exhaust gas makes a turn of more than 90° before exiting said inner chamber, and an outlet from said outer shell for passing exhaust gas out of said reactor, said outlet being positioned in said outer shell so that the exhaust gas passes indirectly from said inner chamber to said outlet through said annular space, said reactor having a total internal free volume of at least twice the displacement volume of any one cylinder exhausting into it and not greater than four times the total displacement volume of all cylinders exhausting into it.

8. The exhaust manifold reactor of claim 7 in which each passage means has throughout its length a cross sectional area of 0.75 to 1.25 times the cross-sectional area of the exhaust port of the engine.

9. The exhaust manifold reactor of claim 7 in which said passage means terminate in said inner chamber such that at least two of the streams of exhaust gas enter the mixing zone at angles of at least 90° with respect to each other, and said exit opening in said inner chamber is positioned with respect to the terminal portion of said passage means such that all streams of exhaust gas entering said mixing zone make a turn of at least 90° before exiting said inner chamber and a portion of the gas in at least one stream of exhaust gas makes a turn of 180° before exiting said inner chamber.

10. The exhaust manifold reactor of claim 7 in which said reactor has a total internal free volume of 0.75 to 3 times the total displacement volume of all cylinders exhausting into it.

11. The exhaust manifold reactor of claim 7 in which each passage means has throughout its length a cross-sectional area of 0.75 to 1.25 times the cross-sectional area of the exhaust port of the engine, said passage means terminate in said inner chamber such that at least two of the streams of exhaust gas enter the mixing zone at angles of at least 90° with respect to each other, said exit opening in said inner chamber is positioned with respect to the terminal portion of said passage means such that all streams of exhaust gas entering said mixing zone make a turn of at least 90° before exiting said inner chamber and a portion of the gas in at least one stream of the exhaust gas makes a turn of 180° before entering said inner chamber, and said reactor has a total internal free volume of 0.75 to 3 times the total displacement volume of all cylinders exhausting into it.

12. The exhaust manifold reactor of claim 7 in which means is provided for preheating each stream of exhaust gas entering said inner chamber for substantially the entire path of the exhaust gas from the exhaust port of the engine to said inner chamber by heat exchange with the exhaust gas in said annular space.

13. The exhaust manifold reactor of claim 7 in which said passage means are movably attached to said outer shell and said inner chamber, and said inner chamber is movably attached to said outer shell by a slip-fit mounting.

References Cited

UNITED STATES PATENTS

| | | | |
|---|---|---|---|
| 3,247,666 | 4/1966 | Behrens | 60—30 |
| 3,302,394 | 2/1967 | Pahnke | 60—30 |

MARTIN P. SCHWADRON, *Primary Examiner.*

DOUGLAS HART, *Assistant Examiner.*

Dedication 3,413,803.—*Iver Theodore Rosenlund*, Chester County, Pa. and *Walter Harold Douthit*, New Castle County, Del. EXHAUST MANIFOLD REACTION SYSTEM AND APPARATUS. Patent dated Dec. 3, 1968. Dedication filed Mar. 24, 1971, by the assignee, *E. I. du Pont de Nemours and Company*.

Hereby dedicates the entire term of said patent to the Public.

[*Official Gazette June 15, 1971.*]